United States Patent
Porte et al.

(10) Patent No.: US 6,857,669 B2
(45) Date of Patent: Feb. 22, 2005

(54) DEVICE FOR CONNECTING TWO TUBULAR PIECES OF AN AIRCRAFT TURBINE ENGINE

(75) Inventors: Alain Porte, Colomiers (FR); Jacques Lalane, Saint Orens (FR)

(73) Assignee: Airbus France, Toulouse (FR)

( * ) Notice: Subject to any disclaimer, the term of this patent is extended or adjusted under 35 U.S.C. 154(b) by 87 days.

(21) Appl. No.: 10/434,210

(22) Filed: May 9, 2003

(65) Prior Publication Data

US 2004/0007422 A1 Jan. 15, 2004

(30) Foreign Application Priority Data

Jun. 5, 2002 (FR) .............................. 02 06896

(51) Int. Cl.[7] .............................................. F16L 17/00
(52) U.S. Cl. ......................................... 285/368; 285/47
(58) Field of Search ........................... 181/214; 285/47, 285/368, 363, 379

(56) References Cited

U.S. PATENT DOCUMENTS

| | | | |
|---|---|---|---|
| 4,293,053 A | | 10/1981 | Shuttleworth et al. |
| 4,506,616 A | * | 3/1985 | Nixon .................. 112/475.08 |
| 5,658,024 A | * | 8/1997 | Bachmann et al. .......... 285/47 |
| 6,123,170 A | | 9/2000 | Porte et al. |
| 6,328,258 B1 | | 12/2001 | Porte |

FOREIGN PATENT DOCUMENTS

| | | |
|---|---|---|
| EP | 0352993 | 1/1990 |
| FR | 2474099 | 7/1981 |
| FR | 2767560 | 2/1999 |
| FR | 2787509 | 6/2000 |
| GB | 2010434 | 6/1979 |

* cited by examiner

*Primary Examiner*—Daniel P. Stodola
*Assistant Examiner*—Aaron Dunwoody
(74) *Attorney, Agent, or Firm*—Stevens, Davis, Miller & Mosher, LLP

(57) ABSTRACT

A connecting device for connecting first and second tubular pieces of an aircraft turbine engine may include a rigid ring with an at least approximately S-shaped cross section. The rigid ring is housed in a recess of an acoustic protection cellular core of the first tubular piece and includes: (1) an external branch, which bears against an external skin of the second tubular piece and is secured to the latter by a first fixing device; (2) a back, arranged facing an edge face of the cellular core; (3) a front arranged facing the first tubular piece, after the first and second tubular pieces have been connected; (4) a transverse branch connecting the back to the front; and (5) an internal branch connected to an internal skin of the second tubular piece and secured to the latter.

11 Claims, 5 Drawing Sheets

DEVICE FOR CONNECTING TWO TUBULAR PIECES OF AN AIRCRAFT TURBINE ENGINE

BACKGROUND OF THE INVENTION

The present invention relates to the connecting of two tubular pieces of an aircraft turbine engine such as, for example, the fan case and the air intake, or the nozzle, at least one of which bears an internal acoustic lining.

DESCRIPTION OF THE PRIOR ART

It is known that, in bypass turbojets, the interior wall of the nacelle has an acoustic lining, to absorb some of the noise generated in the fan duct. However, as the wall of this nacelle is made in several parts—fan cowl, air intake, nozzle—it is necessary to provide, between these parts, connecting devices able to give the nacelle mechanical strength without excessively interfering with the noise absorption.

For example, document U.S. Pat. No. 6,123,170 (FR-2 767 560) already discloses a connecting device comprising the connection between:

on the one hand, a first tubular piece of an aircraft turbine engine, provided at its front end with a first annular external flange and the internal wall of which bears an acoustic lining; and on the other hand, a second acoustic tubular piece of said turbine engine, the wall of which consists of a permeable internal skin, an impermeable external skin and a cellular core inserted between said internal and external skins, said connecting device comprising:

an annular connecting piece comprising an annular sleeve externally surrounding the rear end of said second tubular piece, and a second annular external flange;

first fixing means distributed around said sleeve of said connecting piece to secure the latter to said second tubular piece; and second fixing means collaborating with said first and second flanges to secure said first and second tubular pieces along a connecting plane defined by said first and second flanges.

In known connecting devices of this type, said first fixing means (see for example FIG. 2 of the aforesaid document) may pass through said sleeve and all of the thickness of the wall of the rear end of said second tubular piece. In this case, it is necessary for this rear end to have a reinforced structure different from the rest of said second piece so as to transmit the forces between said first and second tubular pieces. The result of this is that such a solution is expensive. In addition, in order to mechanically strengthen the rear end of the second piece, the cellular core is locally less thin and/or filled with a cured adhesive, which means that the acoustic insulation at this rear end is not as good as it is in the remainder of said second piece.

As an alternative, in said known connecting devices (see for example FIG. 3 of the aforesaid document), said first fixing means may pass only through the external skin of the rear end of the second tubular piece, to secure said connecting piece to the latter. In this case, said external skin has a reinforced part forming a projection, toward said first piece, with respect to the remainder of the wall of the second piece, and said first piece has an acoustic projection, toward said first piece, which becomes housed inside said projection of said external skin. This alternative form of embodiment, like the preceding one, is therefore expensive and, in any event, the acoustic insulation at the connection between said first and second pieces is also not as good as it is in the remainder of these pieces.

In addition, the fitting and removal of these known connecting devices, particularly for maintenance and inspection purposes, proves to be somewhat impractical.

Setting out from the principle that attempts hitherto made to obtain acoustic insulation that is as undegraded as possible at the connection between said first and second pieces have been more or less in vain and that they lead to high costs in order to achieve a satisfactorily mechanically strong connection, while at the same time making maintenance more complicated, the subject of the present invention is a connecting device that is simple, easy to fit and to remove, and mechanically very strong and which, furthermore, degrades the acoustic insulation no more than these known devices do.

The object of the present invention is to provide a connecting device able to transmit the significant forces passing through it, while degrading the acoustic insulation as little as possible and allowing maintenance and inspection operations to be performed with ease.

SUMMARY OF THE INVENTION

To this end, according to the invention, the connecting device comprising the connection between:

on the one hand, a first tubular piece of an aircraft turbine engine, provided at its front end with a first annular external flange; and on the other hand, a second acoustic tubular piece of said turbine engine, the wall of which consists of a permeable internal skin, an impermeable external skin and a cellular core inserted between said internal and external skins, said connecting device comprising:

an annular connecting piece comprising an annular sleeve externally surrounding the rear end of said second tubular piece, and a second annular external flange;

first fixing means distributed around said sleeve of said connecting piece and passing through said sleeve and said external skin of the rear end of said second tubular piece to secure the latter to said connecting piece; and second fixing means collaborating with said first and second flanges to secure said first and second tubular pieces along a connecting plane defined by said first and second flanges, is noteable in that:

at the rear end of said second tubular piece the edge face of said cellular core is set back from the edges of said internal and external skins to leave an annular space in the rear end of said second tubular piece;

in said annular space there is housed a rigid ring with an at least approximately S-shaped cross section, comprising:

an external branch, which bears against said external skin and is secured to the latter by said first fixing means;

a back, arranged facing the edge face of said cellular core and which is posssibly secured to the latter;

a front arranged facing said first tubular piece, after said first and second tubular pieces have been connected;

a transverse branch connecting said back to said front; and an internal branch connected to said internal skin and secured to the latter; and said external branch, said back and said transverse branch delimit, in said annular space, an external annular duct which is open on the rear side of said second tubular piece and in which the internal ends of said first fixing means are housed.

Thus, said rigid ring of at least approximately S-shaped cross section forms a very strong mechanical reinforcement able to withstand without damage the forces that have to be transmitted through said connecting device. In addition, said first fixing means which are, for example, of the screw and nut type, are readily accessible for maintenance and inspection through said external annular duct, once said first and second tubular pieces have been separated by removing said second fixing means, which, also, may be of the screw and nut type. Furthermore, because of the S-shape of said rigid ring, the extent to which the cellular core is set back from said internal and external skins may be small enough for the overall acoustic insulation to be degraded only by a very small amount.

In the connecting device according to the present invention, the transverse branch, the front and the internal branch of said S-section ring may:

either delimit, in said annular space, an internal annular duct facing toward said edge face of said core; in this case, in said internal annular duct, there may be arranged a filling ring, the cross section of which corresponds to that of said internal annular duct and which may be secured both to said S-shaped rigid ring and to the edge face of said core;

or form a solid ring, possibly provided, on the opposite side to said front, with a face able to be secured to the edge face of said core.

Thus, in both cases, the connection between said rigid ring of S-shaped cross section and the edge face of the cellular core can be strengthened.

In order to further enhance the robustness of the connection between said annular connecting piece and said second tubular piece, without having an impact on the acoustic insulation, it is advantageous to provide, as described in document U.S. Pat. No. 6,123,170 (FR-2 767 560) recalled hereinabove, in addition to said first fixing means, blind fixing means distributed around the sleeve of the connecting piece and passing through said sleeve and the external skin of the rear end of the second tubular piece, in line with said annular core.

However, in order to avoid fatigue in said blind fixing means, which fatigue would lead to maintenance complications, the connecting device according to the invention is designed so that said blind fixing means absorb less than half of the forces transmitted by said connecting device between said first and second tubular pieces, the remainder of said forces being absorbed by said first fixing means.

As an alternative, said first fixing means may be distributed in at least two separate sets, spaced apart along said annular sleeve.

The rigid ring of S-shaped cross section according to the present invention may be made of metal, for example of stainless steel or aluminum-based alloy. However, it may, as an alternative, consist of a fiber-matrix composite component.

BRIEF DESCRIPTION OF THE DRAWINGS

The figures of the appended drawing will make it easy to understand how the invention may be embodied. In these figures, identical references denote elements that are similar.

DESCRIPTION OF THE PREFERED EMBODIMENTS

Figure 1:
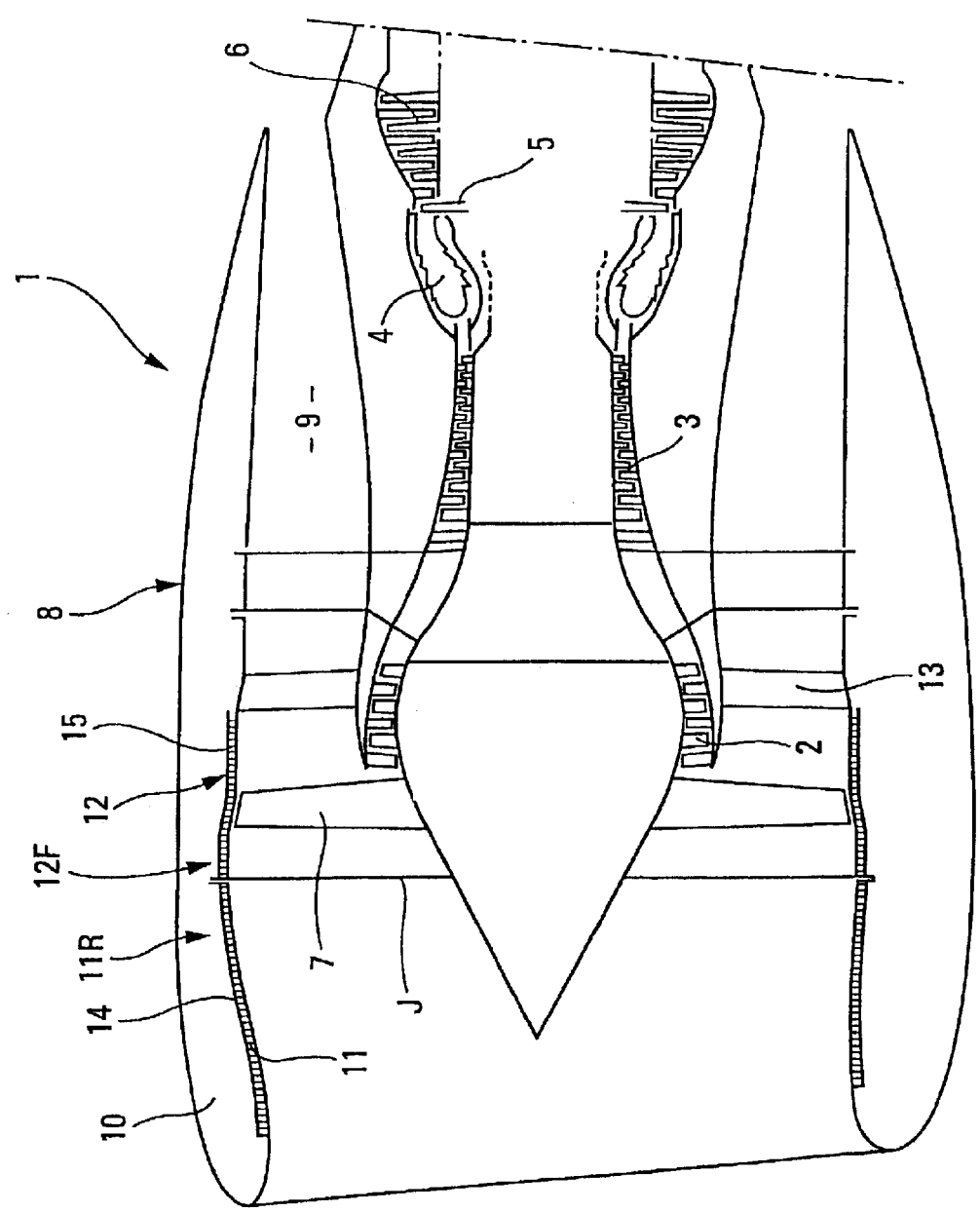
FIG. 1 is a schematic view, in axial section, of an aircraft turbine engine.

The bypass turbojet 1 depicted schematically in FIG. 1 comprises, in a known way and in alignment, a low-pressure compressor 2, a high-pressure compressor 3, a combustion chamber 4, a high-pressure turbine 5 and a low-pressure turbine 6. The low-pressure turbine 2 drives the rotation of a fan rotor 7, placed at the front of said turbine engine. Around these elements 2 to 7, and coaxial with respect to them, is arranged a nacelle 8, forming, with these elements, an annular fan duct 9 through which the rotor blades of the fan 7 blow.

The front part of the nacelle 8 forms an annular air intake structure 10, the leading edge of which is streamlined. At its rear end 11R, the interior wall 11 of the air intake structure 10 is usually fixed to the front end 12F of an annular fan case 12 along a connecting plane J. This fan case J is arranged around the fan 7 and connected rigidly to the structure of the central engine 2 to 6 by at least one set of radially-directed arms 13. This rigid mechanical connection between the fan case 12 and the central engine structure 2 to 6 allows optimum control over the clearance between this case and the ends of the blades of the fan 7.

In modern turbine engines, reducing the noise is one of the prime objectives. To do this, it is common practice for most of the interior wall of the nacelle 8 to be produced in the form of a noise-attenuating acoustic lining. As depicted schematically and partially in FIG. 1, the interior wall 11 of the air intake structure 10, and also possibly the fan case 12, usually have, at least in part, such an acoustic lining 14 or 15, respectively.

The subject of the present invention, in the embodiments described hereinabove, is a connecting device providing the connection, along the plane J, between the rear end 11R of the interior wall 11 of the air intake structure 10 and the front end 12F of the fan case 12.

Figure 2:
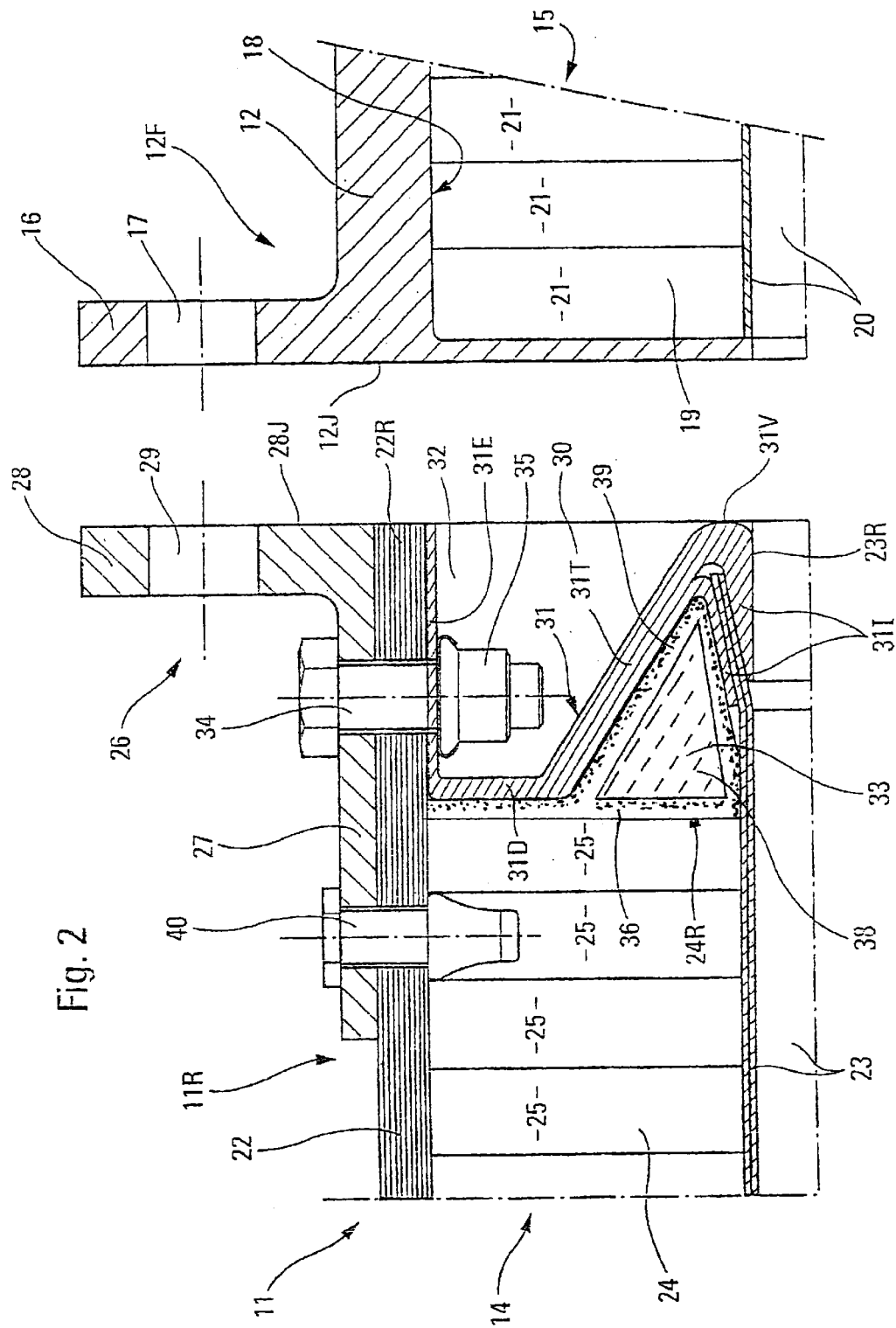
FIG. 2 illustrates, in axial part section, the connection, achieved according to the present invention, between the interior wall of the air intake and the fan case, before these elements are assembled.

As can be seen in the exemplary embodiment of FIG. 2, the front end 12F of the tubular fan case 12, generally made of metal, is provided with an annular external flange 16, pierced with peripheral holes 17 and delimiting an annular end face 12J. The internal wall 18 of the case 12 may bear an acoustic lining 15, which consists for example of a cellular core 19, covered with an annular internal skin 20. The cellular core 19 is of the honeycomb type with cells 21 as deep as possible, whereas the internal skin 20 is air-permeable and made, for example, of a perforated metal sheet or a perforated carbon or metal gauze.

Furthermore, the rear end 11R of the annular interior wall 11 of the air intake structure 10 consists of an impermeable external skin 22, a permeable internal skin 23 and an intermediate cellular core 24. The impermeable external skin 22 is, for example, a multilayer composite structure able to act as an acoustic reflector and to give the wall 11 its mechanical strength. The cellular core 24 has cells 25 and in structure is similar to the cellular core 19. Likewise, the permeable internal skin 23 has a structure similar or identical to that of the internal skin 20.

Around the rear end 11R of the wall 11 there is an annular connecting piece 26 comprising an annular sleeve 27 surrounding said rear end 11R and an annular external flange 28, pierced with peripheral holes 29 and delimiting an end face 28J for said end 11R.

Figure 3:
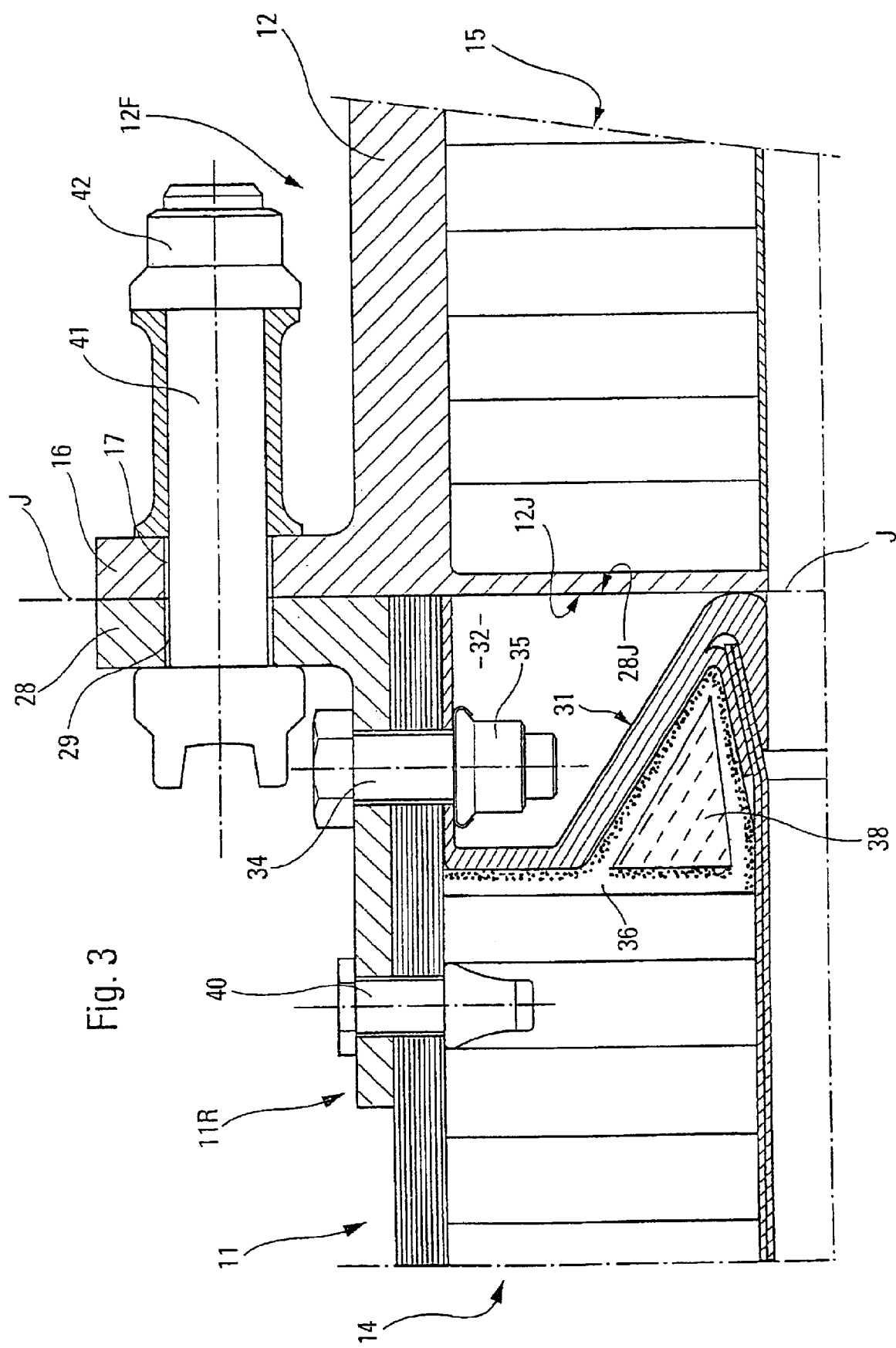
FIG. 3 illustrates, in a view similar to FIG. 2, said connection, after the interior wall of the air intake and of the fan case have been assembled.

As is depicted in FIGS. 2 and 3, at the rear end 11R of the wall 11, the annular edge face 24R of the cellular core 24 is set back from the edges 22R and 23R of the skins 22 and 23 to leave an annular space 30, open through the flange 28.

A rigid ring 31 having an at least approximately S-shaped cross section is housed in said annular space 30 and divides the latter into two coaxial annular ducts 32 and 33. The annular duct 32 is external and is open on the rear side of the end 11R, through the flange 28. The annular duct 33 is internal and faces toward the edge face 24R of the cellular core 24 of the wall 11.

The rigid ring 31 may be made of metal (for example stainless steel or aluminum alloy) or have a composite structure consisting of several plies of carbon fiber or similar fibers.

Whatever its structure, the rigid ring 31 comprises:

an external branch 31E which bears against the external skin 22 and is secured to the latter by screw 34 and nut 35 assemblies, made of steel or titanium, for example. The assemblies 34, 35 are distributed around the annular sleeve 27 and pass through the latter and the external skin 22 in order in addition to secure said sleeve 27 to the rear end 11R. The nuts 35 are arranged in the external annular duct 32 and are therefore accessible through the flange 28;

a back 31D which is arranged facing the edge face 24R of the cellular core 24 and which may be secured to this edge face by a layer of adhesive 36;

a front 31V which is set back slightly from the end face 28J of the rear end 11R and which is arranged facing the annular end face 12J of the front face 12F once the ends 11R and 12F have been connected;

a transverse branch 31T connecting the back 31D and the front 31V; and an internal branch 31I connected to the internal skin 23 and secured to the latter.

Inside the internal annular duct 33 there may be placed a filling ring 38, the cross section of which corresponds to that of said internal annular duct 33 and which may be secured to the edge face 24R of the cellular core 24 by said layer of adhesive 36 and to the rigid ring 31 by a layer of adhesive 39, inserted between this filling ring and the branches 31T and 31I of the rigid ring. As an alternative, the filling ring 38 may be a protrusion from the cellular core 24.

On the opposite side of the sleeve 27 to the flange 28 there are blind bolts 40, distributed around the sleeve 27 of the connecting piece 26 and passing through said sleeve 27 and said external skin 22 of the rear end 11R, in line with the cellular core 24. All of the elements 26, 27, 34–35 and 40 are designed so that the blind bolts 40 have to withstand only less than half the forces transmitted between the tubular pieces 11 and 12.

As illustrated by FIG. 3, to assemble the tubular pieces 11 and 12, the end faces 12J and 28J are pressed firmly together, forming the joining plane J and bolts 41 are introduced into the facing holes 17 and 29 of the flanges 16 and 28. After this, nuts 42 are screwed onto said bolts 41 to press said flanges together.

Figure 4:
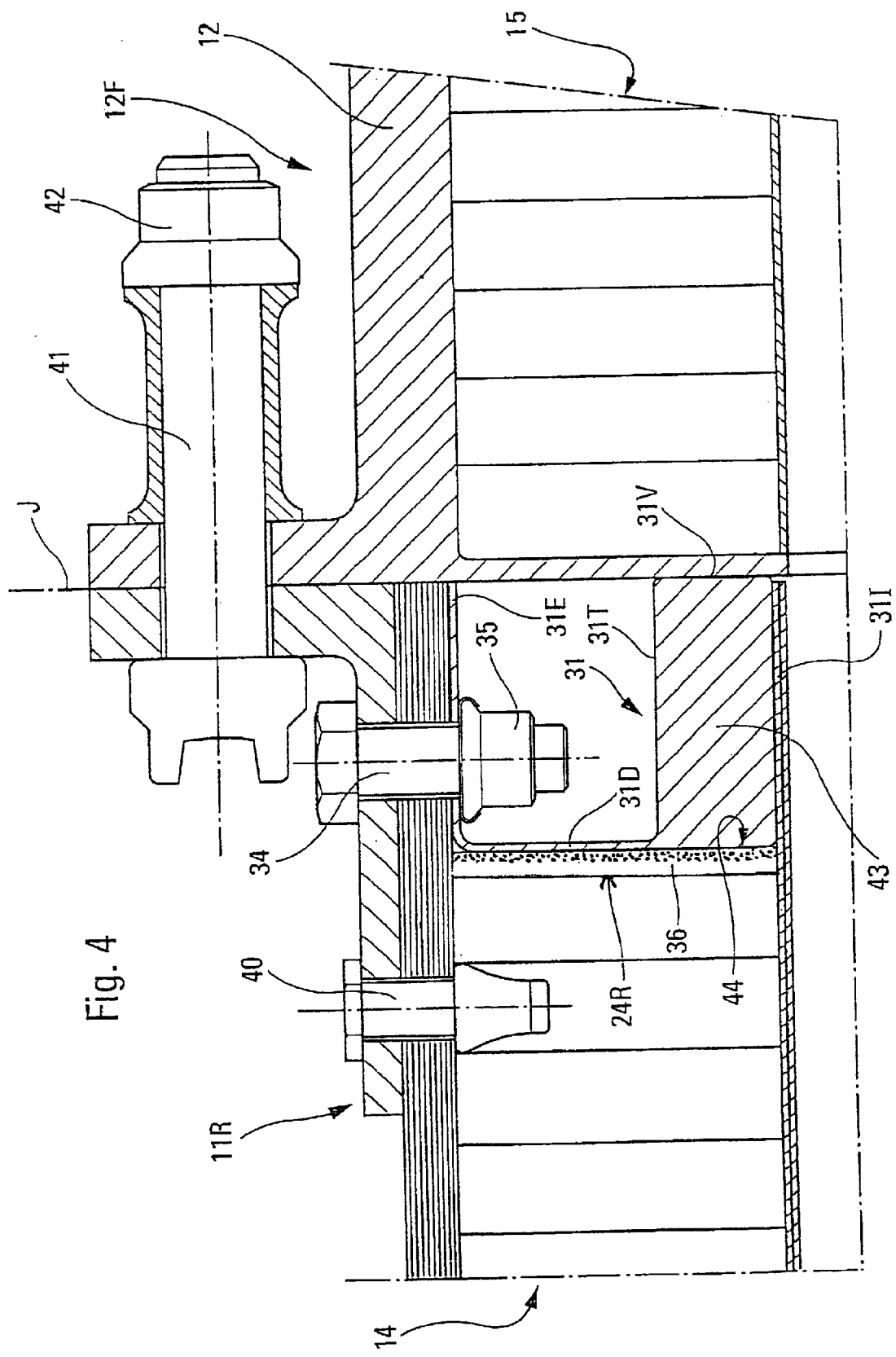
FIG. 4 illustrates, in a view similar to FIG. 3, an alternative form of embodiment of the connection according to the present invention.

In the alternative form of embodiment of the rigid ring 31 which embodiment is depicted in FIG. 4, the transverse branch 31T, the front 31V and the internal branch 31I form a solid ring 43 which may, on the opposite side to said front 31V, be provided with a face 44 able to be secured to the edge face 24R of the cellular core 24. As a preference, the face 44 is then in the continuation of the back 31D, so that the rigid ring 31 can be secured over the entire height of said edge face 24R by the layer of adhesive 36.

Figure 5:
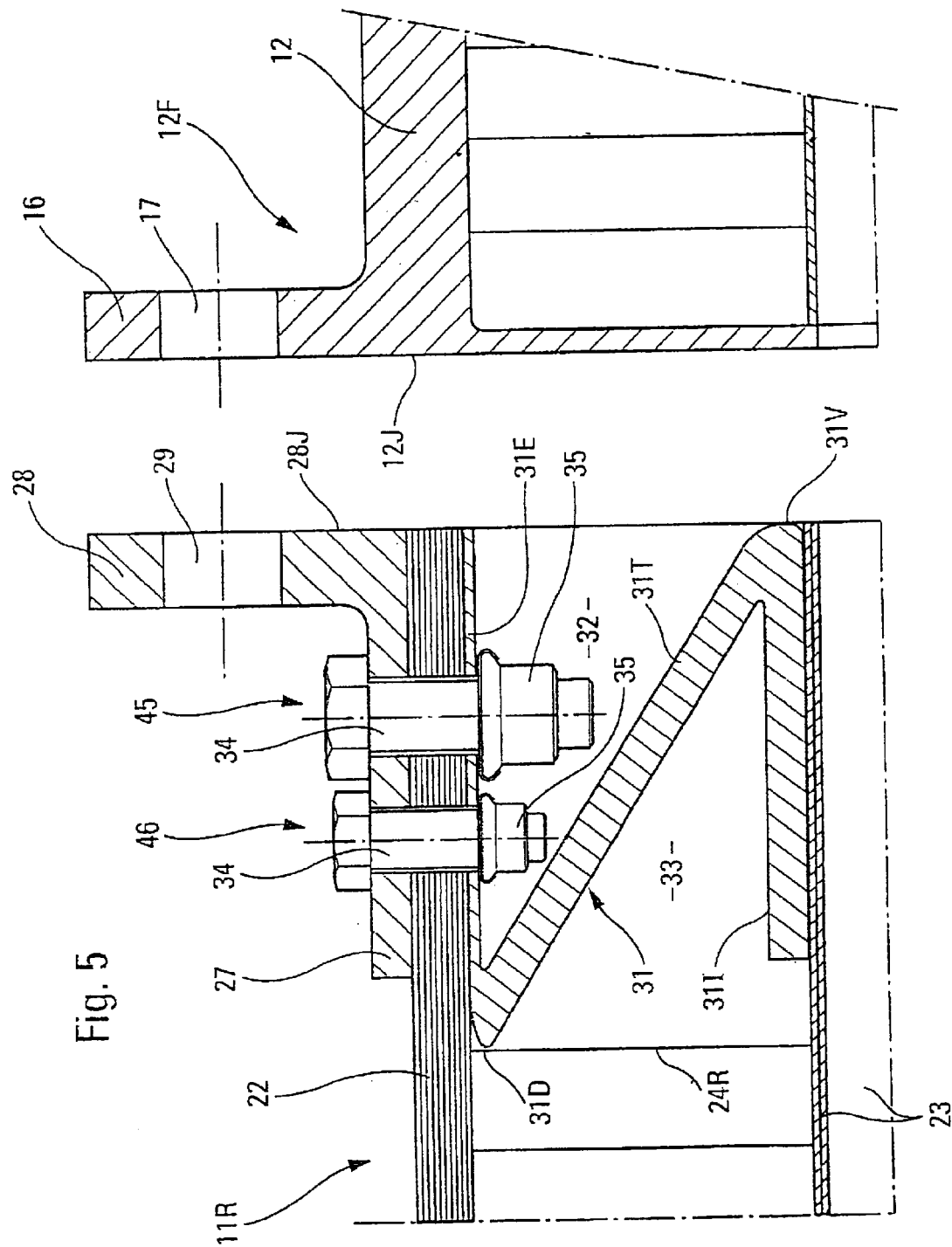
FIG. 5 illustrates, in a view similar to FIG. 2, yet another alternative form of the connection according to the present invention.

In the alternative form of embodiment depicted in FIG. 5, the rigid ring 31 has a back 31D which is practically a discrete point, not secured to the edge face 24R of the core 24. Likewise, the front 31V is also practically a discrete point. The internal annular duct 33 is empty (with no filling ring 38). Furthermore, the screw 34 and nut 35 assemblies are distributed into two separate sets 45 and 46, spaced apart along said annular sleeve 27. The screws 34 and nuts 35 in the set 46 may be the same as or different than (as is depicted in FIG. 5) the screws 34 and the nuts 35 in the set 45.

It is claimed:

1. A connecting device providing a connection between a first tubular piece of an aircraft turbine engine, provided at its front end with a first annular external flange and a second acoustic tubular piece of said turbine engine, the wall of which comprises a permeable internal skin, an impermeable external skin and a cellular core inserted between said internal and external skins, said connecting device comprising:

an annular connecting piece comprising an annular sleeve externally surrounding the rear end of said second tubular piece, and a second annular external flange;

first fixing means, distributed around said sleeve of said connecting piece and passing through said sleeve and said external skin of the rear end of said second tubular piece, for securing the latter to said connecting piece; and second fixing means, collaborating with said first and second flanges, for securing said first and second tubular pieces along a connecting plane defined by said first and second flanges, wherein:

at the rear end of said second tubular piece the edge face of said cellular core is set back from the edges of said internal and external skins to leave an annular space in the rear end of said second tubular piece;

in said annular space there is housed a rigid ring with an at least approximately S-shaped cross section, comprising:

an external branch, which bears against said external skin and is secured to the latter by said first fixing means;

a back, arranged facing the edge face of said cellular core;

a front arranged facing said first tubular piece, after said first and second tubular pieces have been connected;

a transverse branch connecting said back to said front; and an internal branch connected to said internal skin and secured to the latter; and said external branch, said back and said transverse branch delimit, in said annular space, an external annular duct which is open on the rear side of said second tubular piece and in which the internal ends of said first fixing means are housed.

2. The connecting device as claimed in claim 1, wherein said back is secured to the edge face of the cellular core.

3. The connecting device as claimed in claim 1, wherein said transverse branch, said front and said internal branch delimit, in said annular space, an internal annular duct facing toward said edge face of said core and wherein, arranged in said internal annular duct, is a filler ring having a cross section of which corresponds to that of said internal annular duct.

4. The connecting device as claimed in claim 3, wherein said filler ring is secured both to said rigid ring and to the edge face of the core.

5. The connecting device as claimed in claim 1, wherein said transverse branch, said front and said internal branch form a solid ring.

6. The connecting device as claimed in claim 5, wherein said solid ring is provided, on the opposite side to said front, with a face for being secured to the edge face of the core.

7. The connecting device as claimed in claim 1, wherein said first fixing means are distributed in at least two separate sets, spaced apart along said annular sleeve.

8. The connecting device as claimed in claim 1, further comprising, in addition to said first fixing means, blind fixing means, distributed about said sleeve of said connecting piece and passing through said sleeve and said external skin of the rear end of said second tubular piece in line with said cellular core, for contributing to securing said sleeve to said second tubular piece.

9. The connecting device as claimed in claim 8, wherein said blind fixing means absorb less than half of the forces transmitted by said connecting device between said first and second tubular pieces.

10. The connecting device as claimed in claim 1, wherein said rigid ring of S-shaped cross section is made of metal.

11. The connecting device as claimed in claim 1, wherein said rigid ring of S-shaped cross section is a fiber-matrix composite component.

* * * * *